United States Patent
Ruppert

(10) Patent No.: US 10,668,531 B2
(45) Date of Patent: Jun. 2, 2020

(54) 3D PRINTING METHOD AND POWDER MIXTURE FOR 3D PRINTING

(71) Applicant: AIRBUS OPERATIONS GMBH, Hamburg (DE)

(72) Inventor: Bernd Ruppert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 953 days.

(21) Appl. No.: 15/060,966

(22) Filed: Mar. 4, 2016

(65) Prior Publication Data

US 2016/0256926 A1 Sep. 8, 2016

(30) Foreign Application Priority Data

Mar. 4, 2015 (DE) .......................... 10 2015 203 873

(51) Int. Cl.
*B22F 3/10* (2006.01)
*B22F 3/11* (2006.01)
(Continued)

(52) U.S. Cl.
CPC .............. *B22F 1/02* (2013.01); *B22F 3/1055* (2013.01); *B28B 1/001* (2013.01); *B33Y 10/00* (2014.12);
(Continued)

(58) Field of Classification Search
CPC ...... B22F 1/02; B22F 2999/00; B22F 3/1055; B22F 2998/10; C04B 35/622;
(Continued)

(56) References Cited

U.S. PATENT DOCUMENTS 5,182,170 A 1/1993 Marcus et al.
6,814,926 B2 * 11/2004 Geving .................. B33Y 70/00
419/10
(Continued)

FOREIGN PATENT DOCUMENTS

CN 1 309 514 C 4/2007
CN 103 567 352 A 2/2014
(Continued)

OTHER PUBLICATIONS

Translation of CN104164643 (Year: 2014).*
German Search Report for Application No. 10 2015 203 873.4 dated Oct. 22, 2015.

*Primary Examiner* — Haytham Soliman
(74) *Attorney, Agent, or Firm* — Jenkins, Wilson, Taylor & Hunt, P.A.

(57) ABSTRACT

A 3D printing method includes mixing a sintered component which is selected from the group comprising ceramic materials, ceramic material combinations, metal materials, metal material combinations and metal alloys, with at least one surface coating component which is selected from the group comprising boron nitride, graphene, carbon nanotubes, tungsten sulfide, tungsten carbide, molybdenum sulfide, molybdenum carbide, calcium fluoride, caesium molybdenum oxide sulfide, titanium silicon carbide and cerium fluoride, in a powder mixture; and laser sintering or laser melting the powder mixture in a selective laser sintering method or a selective laser melting method.

3 Claims, 2 Drawing Sheets

(51) Int. Cl.

| | |
|---|---|
| *B22F 7/00* | (2006.01) |
| *B22F 1/02* | (2006.01) |
| *B28B 1/00* | (2006.01) |
| *B22F 3/105* | (2006.01) |
| *B33Y 10/00* | (2015.01) |
| *B33Y 70/00* | (2020.01) |
| *C04B 35/628* | (2006.01) |
| *C04B 35/622* | (2006.01) |
| *C22C 26/00* | (2006.01) |
| *C22C 32/00* | (2006.01) |
| *C22C 1/10* | (2006.01) |

(52) U.S. Cl.
CPC ............ *B33Y 70/00* (2014.12); *C04B 35/622* (2013.01); *C04B 35/62828* (2013.01); *C04B 35/62831* (2013.01); *C04B 35/62836* (2013.01); *C04B 35/62839* (2013.01); *B22F 2998/10* (2013.01); *B22F 2999/00* (2013.01); *C04B 2235/386* (2013.01); *C04B 2235/3839* (2013.01); *C04B 2235/3847* (2013.01); *C04B 2235/445* (2013.01); *C04B 2235/446* (2013.01); *C04B 2235/5288* (2013.01); *C04B 2235/6026* (2013.01); *C04B 2235/665* (2013.01); *C22C 1/1031* (2013.01); *C22C 26/00* (2013.01); *C22C 32/0047* (2013.01); *C22C 32/0089* (2013.01); *Y02P 10/295* (2015.11)

(58) Field of Classification Search
CPC ........ C04B 35/62839; C04B 35/62828; C04B 35/62831; C04B 35/62836; C04B 2235/6026; C04B 2235/665; C04B 2235/5288; C04B 2235/446; C04B 2235/445; C04B 2235/386; C04B 2235/3839; C04B 2235/3847; B33Y 70/00; B33Y 10/00; B28B 1/001; Y02P 10/295; C22C 32/0047; C22C 26/00; C22C 1/1031; C22C 32/0089
See application file for complete search history.

(56) References Cited

U.S. PATENT DOCUMENTS

| | | |
|---|---|---|
| 7,258,720 B2 | 8/2007 | Fuwa et al. |
| 9,156,058 B2 | 10/2015 | Brandl et al. |
| 2004/0173335 A1* | 9/2004 | Schaffer .................. B22F 3/26 164/98 |
| 2007/0110608 A1 | 5/2007 | Liu |
| 2007/0290409 A1 | 12/2007 | Brice et al. |
| 2014/0134334 A1 | 5/2014 | Pridoehl et al. |

FOREIGN PATENT DOCUMENTS

| | | |
|---|---|---|
| CN | 104164643 A * | 11/2014 |
| DE | 199 09 882 A1 | 9/2000 |
| DE | 10 2010 055 201 A1 | 6/2012 |
| WO | WO 01/56736 A2 | 8/2001 |

* cited by examiner

3D PRINTING METHOD AND POWDER MIXTURE FOR 3D PRINTING

CROSS-REFERENCE TO RELATED APPLICATION

This application claims priority to German patent application DE 10 2015 203 873.4 filed Mar. 4, 2015, the entire disclosure of which is incorporated by reference herein.

TECHNICAL FIELD

The disclosure herein relates to a power mixture and to a method for 3D printing, in particular for producing components having improved material properties in the field of aviation and aerospace.

BACKGROUND

Stereolithography (SLA), selective laser sintering (SLS) and selective laser melting (SLM) belong to the group of generative manufacturing methods and are also generally also referred to as "3D printing methods". In this case, data sets are generated on the basis of geometric models, which data sets are used in a special generative manufacturing system for producing objects having a predefined shape from amorphous materials such as liquids and powders, or neutrally shaped semi-finished products such as band-shaped, wire-shaped or strip-shaped material by chemical and/or physical processes. 3D printing methods use additive processes, in which the starting material is sequentially constructed, in layers, in predetermined shapes.

3D printing methods are currently widely used in producing prototypes or in rapid product development (RPD), in which a resource-efficient process chain is used for small-scale and large-scale series production, as required, of individualised components. 3D printing methods have various uses in civil engineering, in architecture, in dental technology, in toolmaking, in implantology, in industrial design, in the automotive industry and in the aviation and aerospace industry.

3D printers, and in particular laser sintering devices, use both a computer-aided construction system (computer-aided design, CAD) and a beam system which carries out the generative layer construction of the object to be printed on the basis of the digital manufacturing model provided by the CAD system. A three-dimensional CAD model of the object to be printed undergoes a preparation procedure here which is carried out in order to generate the control data required for the beam system and is known as "slicing". The CAD model is digitally broken down into layers of a predetermined uniform thickness having layer normals in the construction direction of the beam system, which layers then form the basis for controlling the beam of energy on the starting material surface in the beam system. A conventional layer breakdown algorithm constructs the CAD model on an inlaid surface model in this case, which results in a number of closed curves or surface polygons which define the "slices" between two model sections which are in succession in a manner perpendicular through the construction direction of the beam system.

Surface models of this kind can be stored for example in STL format, which is conventional for stereolithography and which describes the surface geometry of the three-dimensional object to be printed in the form of raw data having unstructured triangle textures. The beam system reads the surface model data and converts the data into a corresponding control pattern for the laser beam in an SLA, SLS or SLM manufacturing method.

3D printing methods such as SLA, SLS or SLM result in significant design freedom in terms of geometrical shape and structure when manufacturing complex three-dimensional components. Similar freedom would be desirable when forming specific material properties of the printed components.

There are various approaches in the prior art which attempt to provide this freedom: CN 103 567 352 A discloses a composition for selective laser sintering consisting of pre-coated sand particles which comprise raw sand, binders, curing agents and a lubricant. CN 1 309 514 C discloses a metal powder composition for selective laser sintering which comprises an iron-based powder, a nickel- and/or nickel alloy-based powder, a copper- and/or copper alloy-based powder and a graphite powder. U.S. Pat. No. 5,182,170 A discloses a laser sintering method in which the sintered materials react with the ambient atmosphere. U.S. Pat. No. 6,814,926 B2 discloses a powder mixture for selective laser sintering which comprises a steel alloy, a binder and high temperature-resistant particles. US 2014/0134334 A1 discloses a 3D extrusion process, in which a surface coating is applied to the extruded filaments upstream of the extrusion head.

SUMMARY

One of the objects of the disclosure herein is therefore that of finding solutions for objects produced in generative manufacturing methods and having improved material properties, in particular by using selective laser sintering methods, selective laser melting methods or stereolithography methods.

According to a first aspect of the disclosure herein, a first 3D printing method therefore comprises mixing a sintered component, which is selected from the group comprising or consisting of ceramic materials, ceramic material combinations, metal materials, metal material combinations and metal alloys, with at least one surface coating component which is selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride, in a powder mixture, and of laser sintering or laser melting the powder mixture in a selective laser sintering method or a selective laser melting method.

According to a second aspect of the disclosure herein, a second 3D printing method comprises generating a shielding gas atmosphere in a 3D printing device, wherein the shielding gas of the shielding gas atmosphere comprises a surface coating component which is selected from the group comprising boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride, and of laser sintering or laser melting a powder mixture in a selective laser sintering method or a selective laser melting method. In this case, the powder mixture comprises a sintered component which is selected from the group comprising or consisting of ceramic materials, ceramic material combinations, metal materials, metal material combinations and metal alloys.

According to a third aspect of the disclosure herein, a third 3D printing method comprises locally injecting a plasma at a working region of a 3D printing device, wherein the plasma comprises a surface coating component which is selected from the group comprising or consisting of boron nitride, graphene, carbon nanotubes, tungsten sulfide, tungsten carbide, molybdenum sulfide, molybdenum carbide, calcuim fluoride, cesium oxythiomolybdate, titanium silicon carbide and cerium fluoride, and of laser sintering or laser melting a powder mixture in a selective laser sintering method or a selective laser melting method in the working region of the 3D printing device, wherein the powder mixture comprises a sintered component which is selected from the group comprising or consisting of ceramic materials, ceramic material combinations, metal materials, metal material combinations and metal alloys.

According to a fourth aspect of the disclosure herein, a powder mixture for use in a 3D printing method comprises a sintered component which is selected from the group comprising or consisting of ceramic materials, ceramic material combinations, metal materials, metal material combinations and metal alloys, and at least one surface coating component which is selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride.

A basic concept of the disclosure herein relates to modifying a conventional 3D printing process, in that reactants which improve and/or modify the material properties of the final printed object are added to the printing process in situ. This results in a local modification of the material properties of the starting material of the 3D printing process during printing.

3D printing processes are advantageous in particular since they make it possible to produce three-dimensional components in primary forming methods without the need for special manufacturing tools adapted to the outer shape of the components. This allows for highly efficient, material-saving and time-saving production processes for components. 3D printing methods of this kind are particularly advantageous for structural components in the field of aviation and aerospace, since a large number of different components are used here which are adapted to specific uses and in 3D printing methods of this kind at low costs, low production lead times and little complexity in the manufacturing plants required for production.

Advantageous embodiments and developments are set out in the description herein and with reference to the drawings.

According to an embodiment of the first 3D printing method according to the disclosure herein, laser sintering or laser melting can be carried out in a shielding gas atmosphere. In this case, in one embodiment, the shielding gas of the shielding gas atmosphere can comprise a surface coating component which is selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride.

According to an embodiment of the second 3D printing method according to the disclosure herein, the powder mixture can comprise at least one surface coating component which is selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride.

According to an embodiment of the 3D printing method according to the disclosure herein, each of the sintered components can be selected from the group comprising or consisting of gold, platinum, palladium, nickel, chromium, iron, aluminum, molybdenum, beryllium, copper, magnesium, cobalt, tin or an alloy thereof.

According to an embodiment of the powder mixture according to the disclosure herein, the sintered component can, in this case, be selected from the group comprising or consisting of gold, platinum, palladium, nickel, chromium, iron, aluminum, molybdenum, beryllium, copper, magnesium, cobalt, tin or an alloy thereof.

The embodiments and developments above can be combined with one another as desired where appropriate. Further possible embodiments, developments and implementations of the disclosure herein also include combinations of features of the disclosure herein which are not explicitly mentioned but have either been previously described or are described in the following with reference to the embodiments. In particular, in the process a person skilled in the art will also add individual aspects as improvements or additions to the relevant basic form of the present disclosure.

BRIEF DESCRIPTION OF THE DRAWINGS

In the following, the present disclosure will be described in more detail with reference to the embodiments shown in the schematic figures, in which.

Figure 1:
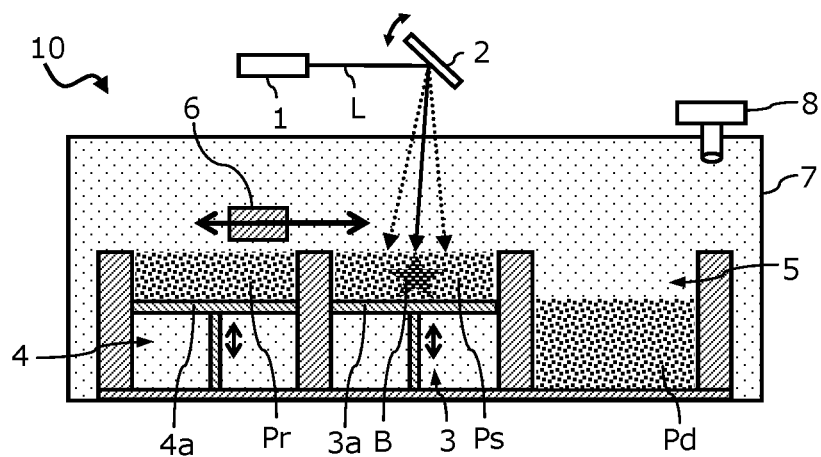
FIG. 1 is a schematic view of a 3D printing device according to one embodiment of the disclosure herein.

The accompanying drawings are intended to provide further understanding of the embodiments of the disclosure herein. They illustrate embodiments and, together with the description, explain principles and concepts of the disclosure herein. Other embodiments and many of the mentioned advantages are revealed in the drawings. The elements of the drawings are not necessarily shown true to scale in relation to one another. Terms specifying direction, such as "upper", "lower", "left", "right", "above", "below", "horizontal", "vertical", "front", "rear" and similar details are used merely for explanatory purposes and are not intended to restrict the generality to specific embodiments as shown in the drawings.

In the figures, identical, functionally identical and identically operating elements, features and components have been provided with the same reference signs in each case, unless indicated otherwise.

DETAILED DESCRIPTION 3D printing methods within the context of the present application include all generative manufacturing methods in which objects having a predefined shape are produced, on the basis of geometric models, from amorphous materials such as liquids and powders or neutrally shaped semi-finished products such as band-shaped, wire-shaped or strip-shaped material by chemical and/or physical processes in a special generative manufacturing system. In the process, 3D printing methods within the context of the present application use additive processes in which the starting material is sequentially constructed, in layers, in predetermined shapes. In this case, 3D printing methods comprise in particular stereolithography (SLA), selective laser sintering (SLS) and selective laser melting (SLM).

FIG. 1 is a schematic view of a 3D printing device 10. The 3D printing device 10 can for example be a system for selective laser sintering, a system for selective laser melting or a stereolithography system. In the following, the 3D printing device 10 is described by way of example in connection with SLS.

An energy source, for example a $CO_2$ laser 1, emits an energy beam, in a locationally selective manner, to a specific part of a powder surface of a powdered material Ps, which lies on a work platform 3a in a working chamber 3. For this purpose, an optical deflection device or a scanner module 2, such as a mobile or tilting mirror, can be provided which deflects the laser beam L onto a specific part of the powder surface of the powder Ps, depending on the tilt position of the mirror.

The powder Ps is heated at the point of impact of the laser beam L such that the powder particles are locally fused and form an agglomerate when cooled. The laser beam L scans the powder surface in accordance with a digital manufacturing model which is provided by a CAD system and is optionally processed. After the selective melting and local agglomeration of the powder particles in the surface layer of the powder Ps, excess powder Pd which is not agglomerated can be transferred to an excess container 5. The work platform 3a is subsequently lowered and new powder Pr is delivered from a powder reservoir 4 comprising a reservoir platform 4a into the working chamber 3, using a levelling roller 6 or another suitable doctor blade device or roller device. In order to accelerate the melting process, the powder Pr from the powder reservoir 4 can be preheated by infrared light to a working temperature which is just below the melting point of the powder.

This results in an iterative generative construction process of a three-dimensional sintered or "printed" object B made of agglomerated powder. In this case, the surrounding powder supports the part of the object B constructed so far, meaning that no external support structure is necessary. The continuous downward movement of the work platform 3a results in layered model generation of the object B.

The entire printing device 10 can be accommodated in a housing 7 in which an atmosphere which is advantageous for the laser sintering process can be generated by suitable feeder 8. A vacuum can be produced in the housing 7 for example. Alternatively, the feeder 8 can also generate a passivating atmosphere comprising an inert gas mixture for example consisting of argon and/or nitrogen.

FIG. 2 through 5 show schematic views of details, given by way of example, of the 3D printing device 10 from FIG. 1 in the region of the working chamber 3. The embodiments shown in FIG. 2 through 5 show special precautions which can be taken in selective laser sintering methods or selective laser melting methods in order to improve the material properties of three-dimensional objects B produced by such processes. In this case, it should be clear that features and groups of features of embodiments described in any of FIGS. 2 to 5 can also be applied to the other embodiments.

Figure 2:
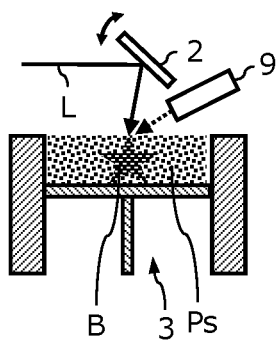
FIG. 2 is a schematic view of details, given by way of example, of a 3D printing device from FIG. 1 according to a further embodiment of the disclosure herein.

FIG. 2 shows the working chamber 3, in which an injection nozzle 9 is additionally arranged. A plasma can be injected in a targeted manner into the 3D printing device 10, in particular at a working region in the working chamber 3 on the powder surface of the powder Ps, by the injection nozzle 9. The injected plasma can be enriched with lubricants, electrolytes or other surface-active components in order to be able to achieve an improvement of the material properties during laser sintering or laser melting of the powder Ps in order to produce the 3D object B. In this case, the plasma can comprise at least one surface coating component, which can achieve the desired material improvements by thermal chemical reactions during laser sintering or laser melting. Surface coating components of this kind can be selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride.

Figure 3:
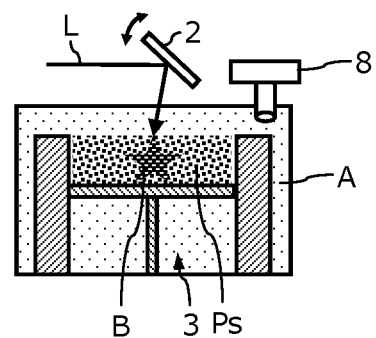
FIG. 3 is a schematic view of details, given by way of example, of a 3D printing device from FIG. 1 according to a further embodiment of the disclosure herein.

FIG. 3 shows the working chamber 3, in which a shielding gas comprising surface coating components can be introduced into the housing 7 in the 3D printing device 10 via the feeder 8 in order to generate a shielding gas atmosphere A in the surroundings of the laser sintering or laser melting process. In a manner similar to FIG. 2, in this case the function of the shielding gas is to improve the material properties of the powder Ps during the 3D printing process.

Figure 4:
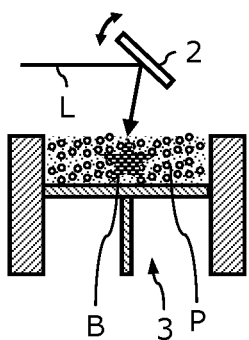
FIG. 4 is a schematic view of details, given by way of example, of a 3D printing device from FIG. 1 according to a further embodiment of the disclosure herein.
Figure 5:
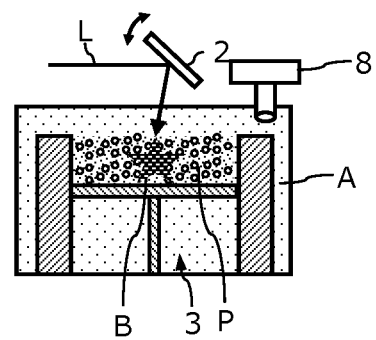
FIG. 5 is a schematic view of details, given by way of example, of a 3D printing device from FIG. 1 according to a further embodiment of the disclosure herein.

FIG. 4 shows the working chamber 3 together with a powder mixture P, which has, in addition to the sintered material, surface coating components already mixed in. FIG. 5 shows the working chamber 3, in which surface coating components can be added to the 3D printing process, both via the powder mixture P of FIG. 4 and via the feeder 8 of FIG. 3, in order to improve the material properties.

Figure 6:
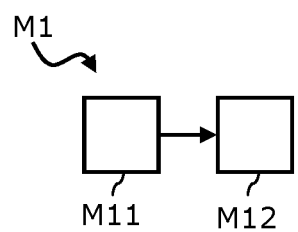
FIG. 6 is a block diagram of a first 3D printing method according to a further embodiment of the disclosure herein.
Figure 7:
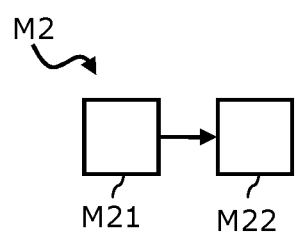
FIG. 7 is a block diagram of a second 3D printing method according to a further embodiment of the disclosure herein.
Figure 8:
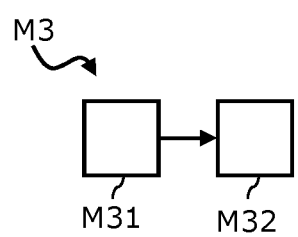
FIG. 8 is a block diagram of a third 3D printing method according to a further embodiment of the disclosure herein.

FIGS. 6, 7 and 8 are each a block diagram of a schematic progression of a 3D printing method which can be implemented in a 3D printing device such as the 3D printing device in FIG. 1. In this case, the different 3D printing methods shown, M1, M2 and M3, can each refer to considerations which correspond to those explained in connection with FIG. 2 through 5.

In a first 3D printing method M1, a step M11 is first carried out in which a sintered component selected from the group comprising or consisting of ceramic materials, ceramic material combinations, metal materials, metal material combinations and metal alloys, together with at least one surface coating component selected from the group comprising boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride, is provided in a powder mixture P. This powder mixture P then undergoes laser sintering or laser melting in a selective laser sintering method or selective laser melting method, respectively, in a step M12. In this case, laser sintering or laser melting can be carried out in a shielding gas atmosphere, for example a shielding gas atmosphere in which the shielding gas used also comprises a surface coating component selected from the group comprising or consisting of boron nitride, graphene, carbon nanotubes, tungsten sulfide, tungsten carbide, molybdenum sulfide, molybdenum carbide, calcium fluoride, cesium oxythiomolybdate titanium silicon carbide and cerium fluoride.

In a second 3D printing method M2, first of all, in a step M21, a shielding gas atmosphere is generated in a 3D printing device 10. In this case, the shielding gas of the shielding gas atmosphere comprises a surface coating component selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride. Finally, in a step M22, laser sintering or laser melting can be carried out in this shielding gas atmosphere, in which step a powder mixture Ps undergoes a selective laser sintering method or a selective laser melting method. In this case, the powder mixture Ps can comprise a sintered component which is selected from the group comprising or consisting of ceramic materials, ceramic material combinations, metal materials, metal material combinations and metal alloys. Here, too, the powder mixture Ps can comprise, in addition to the sintered component, at least one surface coating component selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride.

Finally, a step M31 of locally injecting a plasma into a 3D printing device is carried out in a third 3D printing method M3. This injection can be carried out, in a targeted manner, at a working region of a 3D printing device 10 on a powder surface of a powdered starting material for 3D printing of a 3D object. In this case, the plasma comprises a surface coating component selected from the group comprising or consisting of boron nitride, graphene, carbon nanotubes, tungsten sulfide, tungsten carbide, molybdenum sulfide, molybdenum carbide, calcium fluoride, cesium oxythiomolybdate, titanium silicon carbide and cerium fluoride. Laser sintering or laser melting of a powder mixture Ps in a selective laser sintering method or a selective laser melting method is then carried out in a step M32 at the point at which the plasma is locally injected into the 3D printing device 10. In this case, the powder mixture Ps comprises a sintered component selected from the group comprising or consisting of ceramic materials, ceramic material combinations, metal materials, metal material combinations and metal alloys.

In all the 3D printing methods M1, M2, M3, the sintered component can for example be selected from the group comprising or consisting of gold, platinum, palladium, nickel, chromium, iron, aluminum, molybdenum, beryllium, copper, magnesium, cobalt, tin or an alloy thereof. In this case, it can be particularly advantageous to select aluminum or an aluminum alloy as the sintered component since, on account of its high reactivity with the surroundings, aluminum tends to easily oxidise in conventional 3D printing processes, which is undesired.

Material properties of the object B can be improved by the 3D printing methods M1, M2 and M3, respectively. For example, the sintered particles of the powder mixture can be provided with a surface coating during the laser sintering or laser melting process, which coating can prevent undesired oxidation. Alternatively or in addition, the sintered particles of the powder mixture can be more easily carburised or nitrided if required, in particular in 3D printing processes using steel and steel alloys or aluminum and aluminum alloys.

Moreover, adding the surface treatment materials during the 3D printing process can improve lubrication properties or electrical conductivity properties of the printed object B. Lubricating particles such as graphene, graphite, carbide or sulfide for example can contribute to this. Conductive additional particles can generally improve the electrical conductivity and can, in particular on the surface of printed objects B, significantly improve the contact conductivity of the objects.

In particular when producing press-in sockets from aluminum or aluminum alloys in laser sintering or laser melting methods, the contact points on the outside of the press-in sockets can be formed in a significantly more reliable manner even during 3D printing of the press-in sockets by using additives which are lubricating and/or improve the electrical conductivity.

The methods described can be used in general in all branches of the transport industry, for example for road motor vehicles, for rail vehicles or for watercraft, but also in civil engineering and mechanical engineering.

In the detailed description above, different features have been summarised in one or more examples in order to improve the cogency of what is described. However, it should be clear that the above description is purely for illustrative purposes, but is in no way limiting. It serves to cover all alternatives, modifications and equivalents of the different features and embodiments. A great many other examples will be immediately and directly clear to a person skilled in the art when reading the above description, on account of his knowledge in the art.

The embodiments have been selected and described in order to be able to set out, in the best possible way, the principles on which the disclosure herein is based, and the possible applications thereof in practice. As a result, persons skilled in the art can modify and use the disclosure herein and the different embodiments thereof in an optimal manner with regard to the intended use. In the claims and the description, the terms "containing" and "having" are used as neutral terms for the corresponding term "comprising". Furthermore, use of the terms "a", "an" and "one" is not in principle intended to exclude a plurality of such described features and components. This disclosure hereby incorporates by reference the complete disclosure of any patent or application from which it claims benefit or priority.

What is claimed is:

1. A 3D printing method comprising:
   generating a shielding gas atmosphere in a 3D printing device, wherein a shielding gas of the shielding gas atmosphere comprises a surface coating component which is selected from the group consisting of boron nitride, graphene, carbon nanotubes, tungsten sulfide, molybdenum sulfide, molybdenum carbide, calcium fluoride, cesium oxythiomolybdate, titanium silicon carbide and cerium fluoride; and
   laser sintering or laser melting a powder mixture using a selective laser sintering method or a selective laser melting method in the shielding gas atmosphere, wherein the powder mixture comprises a sintered component which is selected from the group consisting of gold, platinum, palladium, nickel, chromium, iron, aluminum, molybdenum, beryllium, copper, magnesium, cobalt, tin, and alloys thereof.

2. The 3D printing method according to claim 1, wherein the powder mixture comprises at least one surface coating component which is selected from the group consisting of boron nitride, graphene, carbon nanotubes, tungsten sulfide, molybdenum sulfide, molybdenum carbide, calcium fluoride, cesium oxythiomolybdate, titanium silicon carbide and cerium fluoride.

3. A 3D printing method comprising:
   locally injecting a plasma at a working region of a 3D printing device, wherein the plasma comprises a surface coating component which is selected from the group consisting of boron nitride, graphene, carbon nanotubes, tungsten sulfide, molybdenum sulfide, molybdenum carbide, calcium fluoride, cesium oxythiomolybdate, titanium silicon carbide and cerium fluoride; and laser sintering or laser melting a powder mixture using a selective laser sintering method or a selective laser melting method in the working region of the 3D printing device, wherein the powder mixture comprises a sintered component which is selected from the group consisting of gold, platinum, palladium, nickel, chromium, iron, aluminum, molybdenum, beryllium, copper, magnesium, cobalt, tin, and alloys thereof.

\* \* \* \* \*